(12) United States Patent
Chu et al.

(10) Patent No.: US 6,346,954 B1
(45) Date of Patent: Feb. 12, 2002

(54) USER INTERFACE FOR CONFIGURING AND MANAGING A MULTI-DRIVE DATA STORAGE SYSTEM

(75) Inventors: Simon Chu, Chapel Hill; Gayle Steinbugler; Barbara Ballard, both of Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/218,131

(22) Filed: Dec. 21, 1998

(51) Int. Cl.⁷ .............................. G06F 3/00; G06F 1/00
(52) U.S. Cl. .................. 345/764; 345/835; 345/965; 711/114
(58) Field of Search .................. 345/353, 339, 345/348, 965, 835, 764, 841; 711/114, 111; 710/20; 714/5–6

(56) References Cited

U.S. PATENT DOCUMENTS

| | | | |
|---|---|---|---|
| 5,652,863 A | * | 7/1997 | Asensio et al. |
| 5,890,204 A | * | 3/1999 | Ofer et al. ................. 711/111 |
| 5,960,451 A | * | 9/1999 | Voigt et al. ................. 711/114 |
| 6,078,990 A | * | 6/2000 | Frazier ....................... 711/114 |
| 6,088,778 A | * | 7/2000 | Ruff et al. .................. 711/173 |

OTHER PUBLICATIONS

Heywood D. (Que Corp., "Using Windows NT Server 4", Chapter 10—File Storage Systems, 1998.*

* cited by examiner

*Primary Examiner*—Raymond J. Bayerl
*Assistant Examiner*—Sy D. Luu
(74) *Attorney, Agent, or Firm*—Bracewell & Patterson, LLP (57) ABSTRACT

A method and system are disclosed for managing a plurality of data storage systems. A plurality of graphically designatable data storage systems are displayed within a computer system display. A subset of the plurality of graphically designatable data storage systems are selected to be utilized in a data storage array. A data distribution mode for the data array is designated. An iconic representation of selected data storage systems of the data storage array is automatically graphically displayed in response to the selected subset of data storage systems and the designated data distribution mode such that complete data storage arrays may be graphically illustrated for management purposes.

14 Claims, 6 Drawing Sheets

Fig. 1

Fig. 2 --Amended--

USER INTERFACE FOR CONFIGURING AND MANAGING A MULTI-DRIVE DATA STORAGE SYSTEM

BACKGROUND OF THE INVENTION

1. Field of the Invention

The present invention relates in general to a method and system for managing data storage systems and in particular to a method and system for managing data storage systems through graphical illustration of data storage systems. Still more particularly, the present invention relates to a method and system for automatically graphically displaying an iconic representation of data storage systems in response to user selections.

2. Description of the Related Art

As the performance of microprocessor and semiconductor memory technology increases, there is a need for improved data storage systems with comparable performance enhancements. Additionally, in enhancing the performance of data storage systems, there is a need for improved reliability of data stored. In 1988, a paper was published by Patterson, Gibson, Katz, A Case for Redundant Arrays of Inexpensive Disks (RAID), International Conference on Management of Data, pgs. 109–116, June 1988. This paper laid the foundation for the use of redundant arrays of inexpensive disks that would not only improve the data transfer rate and data I/O rate over a comparable single disk access, but would also provide error correction at a lower cost.

RAID includes an array of disks which are typically viewed by a host, such as a computer system, as a single disk. A RAID controller may be a hardware and/or software tool for providing an interface between the host and the array of disks. Preferably, the RAID controller manages the array of disks for storage and retrieval and can view the disks of the RAID separately. The disks included in the array may be any type of data storage systems which can be controlled by the RAID controller when grouped in the array.

The RAID controller is typically configured to access the array of disks as defined by a particular "RAID level." The RAID level specifies how the data is distributed across the disk drives and how error correction is accomplished. In the paper noted above, the authors describe five RAID levels (RAID Level 1–RAID level 5). Since the publication of the paper, additional RAID levels have been designated.

RAID levels are typically distinguished by the benefits included. Three key benefits which may be included in a RAID level are fault tolerance, data availability and high performance. Fault tolerance is typically achieved through an error correction method which ensures that information can be reconstructed in the event of a disk failure. Data availability allows the data array to continue to operate with a failed component. Typically, data availability is achieved through a method of redundancy. Finally, high performance is typically achieved by simultaneous access to multiple disk drives which results in faster I/O and data transfer requests.

By the error correction method, in many RAID levels, additional parity data is stored with the original data. Parity data may be utilized to recover lost data due to disk failure. Parity data is typically stored on one or more disks dedicated for error correction only, or distributed over all of the disks within an array.

By the method of redundancy, data is stored in multiple disks of the array. Redundancy is a benefit in that redundant data allows the storage system to continue to operate with a failed component while data is being replaced through the error correction method. Additionally, redundant data is more beneficial than back-up data because back-up data is typically outdated when needed whereas redundant data is current when needed.

In many RAID levels, redundancy is incorporated through data interleaving which distributes the data over all of the data disks in the array. Data interleaving is usually in the form of data "striping" in which data to be stored is broken down into blocks called "stripe units" which are then distributed across the array of disks. Stripe units are typically predefined as a bit, byte, block or other unit. A "stripe" is a group of corresponding stripe units, one stripe unit from each disk in the array. Thus, "stripe size" is equal to the size of a stripe unit times the number of data disks in the array.

In an example, RAID level 5 utilizes data interleaving by striping data across all disks and provides for error correction by distributing parity data across all disks. I/O request rates for RAID level 5 are high because the distribution of parity data allow the system to perform multiple read and write functions at the same time. RAID level 5 offers high performance, data availability and fault tolerance for the data disks.

Alternatively, in RAID level 1, neither data interleaving nor parity data are utilized. RAID Level 1 utilizes a method of redundancy which is typically referred to as "disk mirroring." In disk mirroring, data is stored on two disks which are said to mirror each other because they contain the same data. In the case of a disk failure, redundant data can be accessed on the mirror disk to provide data availablity and the data in the failed disk can be reconstructed from the redundant data in the mirror disk. Data availablity and fault tolerance are high for RAID level 1, but RAID level 1 does not offer high performance and is typically more costly to implement than other RAID level configurations.

Disk arrays are preferably configured to include logical drives which divide the physical drives in the disk array into logical components which may be viewed by the host as separate drives. Each logical drive includes a cross section of each of the physical drives and is assigned a RAID level. For example, a RAID system may include 10 physical drives in the array. The RAID system is accessible by a network of 4 users and it is desirable that each of the users have separate storage on the disk array. Therefore the physical drives will be divided into four logical drives where each user has access to one of the four logical drives. Logical drive 1 needs to be configured to RAID level 5. Therefore, data will be interleaved across the cross sections of nine of the physical drives utilized by logical drive 1 and parity data will be stored in the cross section of the remaining physical drive.

In configuring RAID systems, there are three primary interaction methods that exist in current configuration programs: command line, physical device location, and trees. Each of the configuration programs requires a user to have knowledge of how RAID systems work, or to rely on default settings. Reliance on default settings often does not compensate for additional equipment added to the RAID system with the intention of enhancing performance.

Command line interfaces require that the user enter textual commands to configure a RAID system. Command line interfaces do not provide a display of the configuration of the RAID system so the user must have a specific understanding of the storage system before using the interface.

Physical device location interfaces display the assumed location of the physical drives within a literal or symbolic representation of the computer hardware that contains the drives. This interface is suitable for understanding physical drives available, but arrays of disks are displayed either by placing an array letter next to the physical drive and its location or by displaying the arrays in a different location entirely. Logical drives are generally not displayed at all. Therefore, the interface is limited in that the interface does not provide the user with a display for properly configuring a RAID system.

Trees display hierarchical lists of components of a RAID system, however the components of a RAID system are not all hierarchical in nature which leads to difficulty in navigating trees. Users may not know in which array a specific physical drive is located, so the tree has to have a special branch for physical drives. Additionally, an array branch is shown including the physical drives included. Therefore, a single physical drive may be displayed under the category of the array it is part of and under the category of the physical drives of the array. The appearance of a single physical drive in multiple locations can be confusing to a user. Logical drives may also be shown similarly in multiple locations.

In many cases, highly knowledgeable technicians may configure a system whereby the above mentioned methods are satisfactory. However, just as often novice users must configure systems and must gain a large understanding of the system in order to use the configuration methods available. Often, novice users require a great deal of technical support to configure their systems by the methods available. It should therefore be apparent that a need exists for a method and system which graphically represents computer storage systems such that users can easily understand and manage their computer storage systems.

SUMMARY OF THE INVENTION

It is therefore one object of the present invention to provide a method and system for managing data storage systems.

It is another object of the present invention to provide a method and system for managing data storage systems through graphical illustration of data storage systems.

It is yet another object of the present invention to provide a method and system for graphically displaying an iconic representation of the data storage systems in response to user selections.

The foregoing objects are achieved as is now described. A method and system are disclosed for managing a plurality of data storage systems. A plurality of graphically designatable data storage systems are displayed within a computer system display. A subset of the plurality of graphically designatable data storage systems are selected to be utilized in a data storage array. A data distribution mode for the data array is designated. An iconic representation of selected data storage systems of the data storage array is automatically graphically displayed in response to the selected subset of data storage systems and the designated data distribution mode such that complete data storage arrays may be graphically illustrated for management purposes.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

The present invention may be implemented on a variety of computers under a number of different operating systems. The computer may be, for example, a personal computer, a mini-computer, or a mainframe computer. The computer may be a stand-alone system or part of a network such as a local area network (LAN) or a wide area network (WAN). For the purpose of illustration, a preferred embodiment of the present invention as described below is implemented on a personal computer, such as the Aptiva™ series manufactured by International Business Machines Corporation, having access to at least one data storage array which is preferably a IBM ServeRAID™ storage system. However, the present invention may be implemented with access to any other data storage array.

Figure 1:
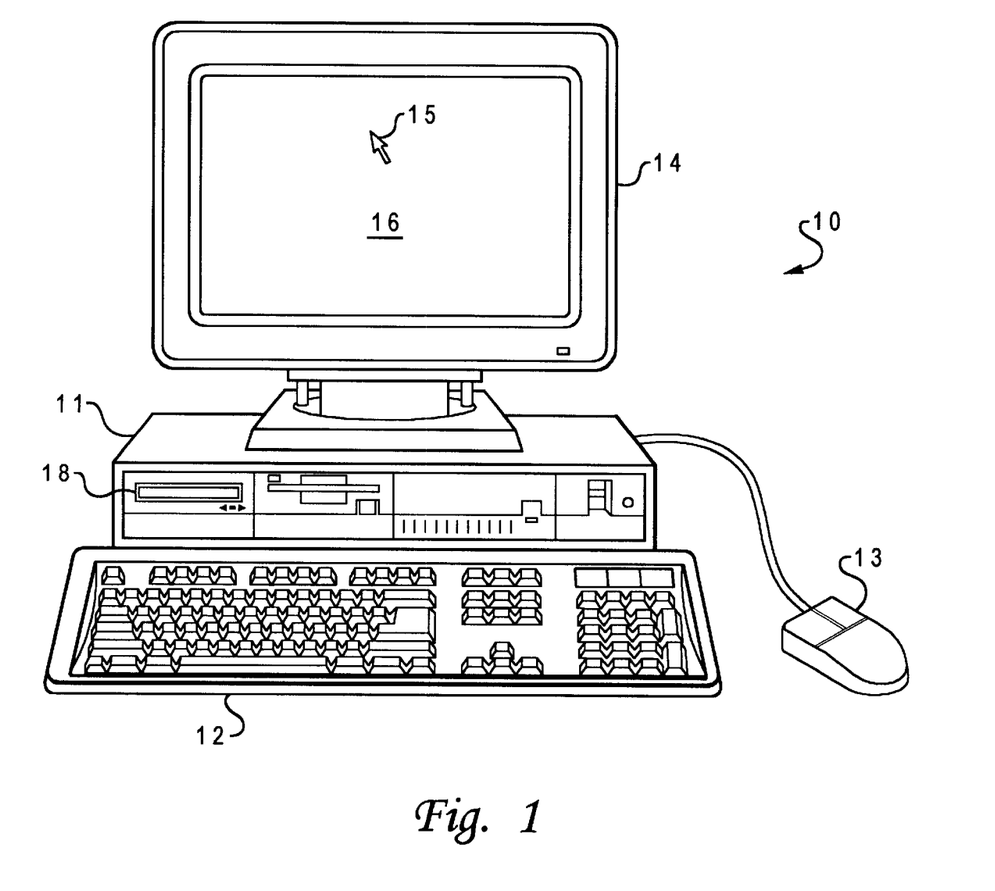
FIG. 1 depicts a representative hardware environment of a personal computer in accordance with the method and system of the present invention.

Referring now to the figures and in particular with reference to FIG. 1, there is illustrated a diagram of a representative hardware environment of a personal computer 10 which utilizes an operating system having the present invention incorporated within. Personal computer 10 comprises processor unit 11, keyboard 12, mouse 13, and video display (or monitor) 14. Keyboard 12 and mouse 13 constitute user input devices, and video display 14 constitutes an user output device. Mouse 13 is utilized to control cursor 15 displayed on screen 16 of video display 14. Personal computer 10 supports a Graphical User Interface (GUI) which allows a user to "point-and-click" by moving cursor 15 to an icon or specific location on screen 16 via mouse 13 and then depressing one of the buttons on mouse 13 in order to perform a user command.

Figure 2:
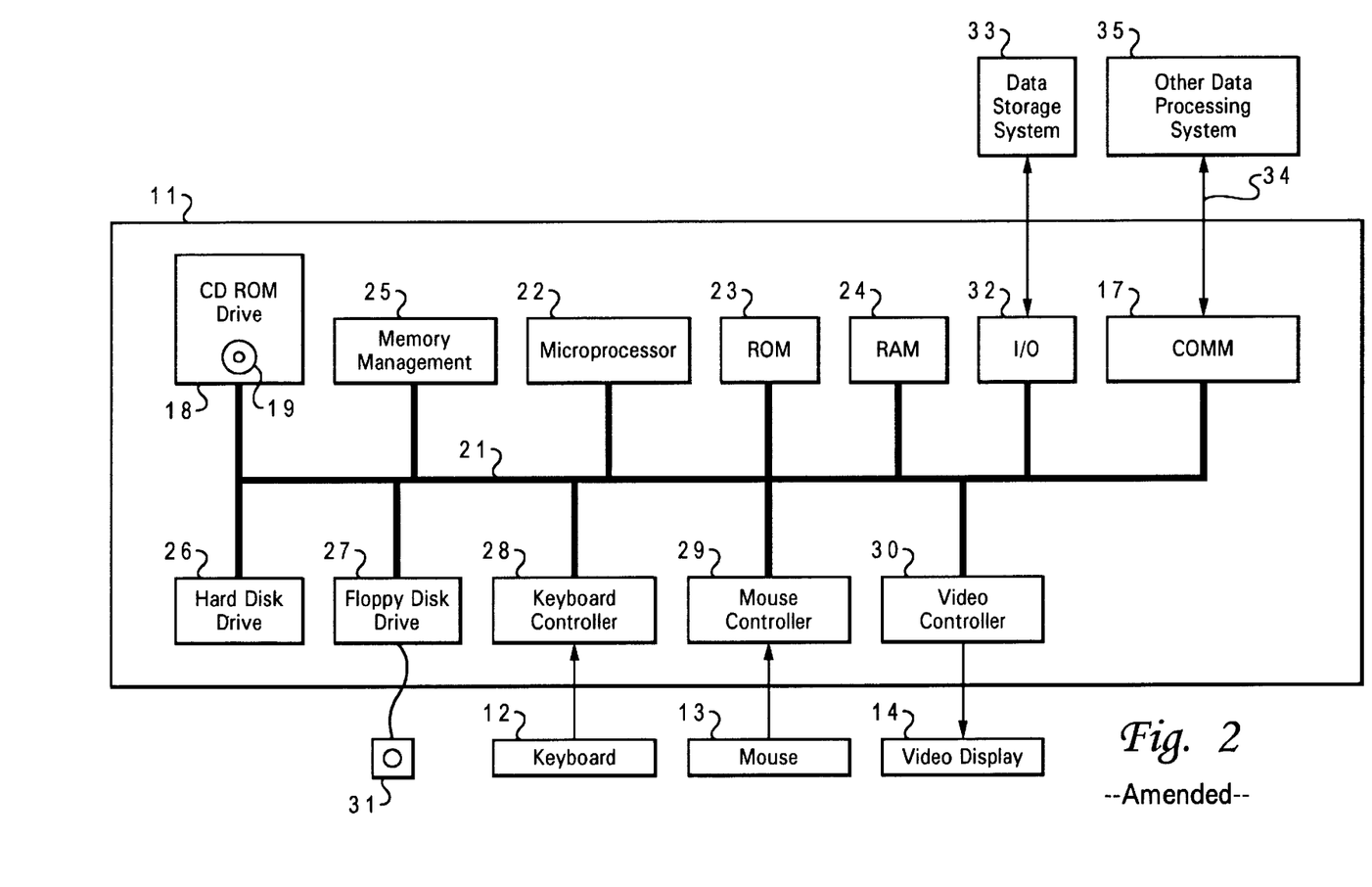
FIG. 2 illustrates a functional block diagram of a personal computer illustrated in FIG. 1 in accordance with the method and system of the present invention.

With reference now to FIG. 2, there is depicted a functional block diagram of personal computer 10 illustrated in FIG. 1. Processor unit 11 includes a system bus 21 to which various functional blocks are attached and by which communications among various functional blocks are accomplished. Microprocessor 22, connecting to system bus 21, is supported by read only memory (ROM) 23 and random access memory (RAM) 24, both of which are connected to system bus 21. Microprocessor 22 in the International Business Machines Corporation's Aptiva™ series of computers is one of the Intel® family of microprocessors, but other microprocessors manufactured by Hewlett Packard, Inc.; Sun Microsystems; Motorola, Inc.; and others may be applicable also.

ROM 23 contains, among other codes, the Basic Input/Output System (BIOS) which controls certain basic hardware operations, such as interactions of hard disk drive 26 and floppy disk drive 27. RAM 24 is the main memory within which the operating system having the present invention incorporated and other application programs are loaded. A memory management device 25 is connected to system bus 21 for controlling all Direct Memory Access (DMA) operations such as paging data between RAM 24 and hard disk drive 26 or floppy disk drive 27. Software which directs the implementation of the present invention may be provided to personal computer 10 for storage in personal computer 10 via a variety of signal-bearing media which include, but are not limited to writeable storage media such as a floppy disk 31 which may be readable by floppy disk drive 27 for storage into ROM 23.

Referring still to FIG. 2, an I/O adapter 32 is illustrated connected to system bus 21 for providing an interface for data storage peripheral devices such as data storage system 33. Additional I/O adapters may be included to expand the storage capacity accessible by personal computer 10.

Other peripheral devices illustrated include a compact disk drive 18 having a compact disk 19 inserted therein which is installed within processor unit 11. In addition, peripherals such as optical storage media, printers, etc. may also be added to personal computer 10. Further, a communications adapter (COMM) 17 may be utilized to communicate with other data processing systems 35 across communications line 34. Communications adapter 17 may be a modem, an ethernet adapter card, or a plurality of other adapters which allows personal computer 10 to communicate with other data processing systems.

To complete the description of processor unit 11, there are three input/output (I/O) controllers, namely, keyboard controller 28, mouse controller 29 and video controller 30, all of which are connected to system bus 21. As their names imply, keyboard controller 28 provides the hardware interface for keyboard 12, mouse controller 29 provides the hardware interface for mouse 13, and video controller 30 provides the hardware interface for video display 14. FIGS. 1 and 2 are typical but may vary for a specific application.

Figure 3:
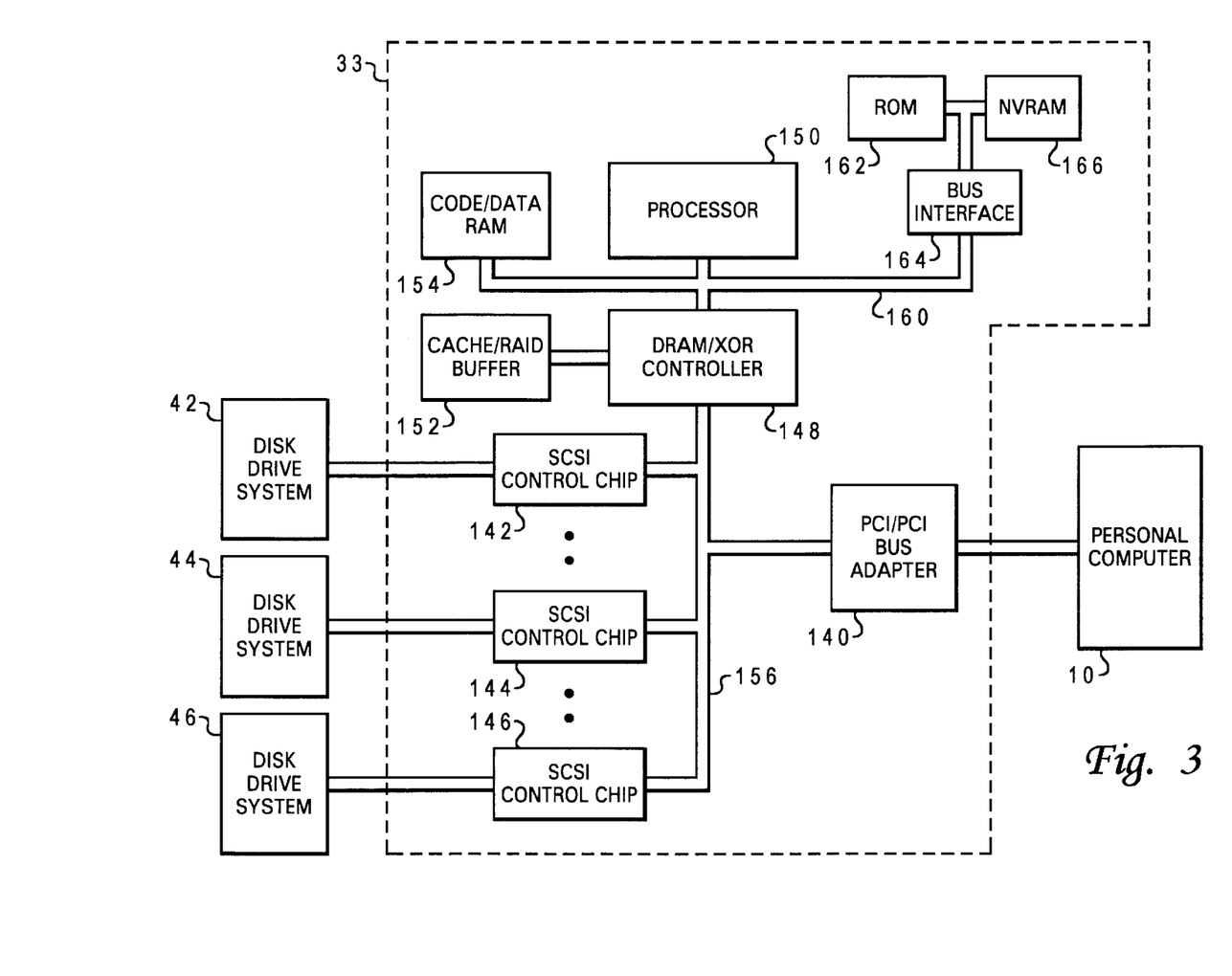
FIG. 3 depicts a high level block diagram of a data storage system according to the method and system of the present invention.

Referring now to FIG. 3 there is depicted a high level block diagram of data storage system 33 which is coupled to a host such as personal computer 10 via PCI/PCI bus adapter 140. In other embodiments, the components of the data storage system may be incorporated into the personal computer 10.

As illustrated, processor 150 is utilized to control data storage system 33 which is preferably a RAID data storage system. Processor 150 is preferably an advanced microprocessor which is coupled to processor bus 160. As depicted, also coupled to processor bus 160 is code/data RAM 154 which is utilized to temporarily store code and data utilized by processor 150. ROM 162 and non-volatile random access memory (NVRAM) 166 are typically accessed utilizing an 8 bit bus and thus bus interface 164 is utilized to interface those devices to processor bus 160, a 32 bit bus.

Operational code is typically stored within ROM 162, which, as those skilled in the art will appreciate, is generally provided utilizing so-called "flash" ROM. Operational code is thereafter fetched from ROM 162 by processor 150 upon initiation of operation. NVRAM 166 is typically a low power CMOS memory which is powered up for "back-up" by a battery such that the information stored in NVRAM will not be lost when main power is terminated. Thus, NVRAM 166 may be utilized to store configuration data or operational code in a manner similar to that stored within ROM 162. ROM 162 is generally updated at initial power application and any changes to system configuration during operation are stored within NVRAM 166 and then entered into a "device change list" which is also stored within NVRAM 166 and on each disk drive within the system.

A cache/RAID buffer 152 is also provided which is coupled to DRAM/XOR controller 148. DRAM/XOR controller 148 is utilized to control access to random access memory and also provides a hardware implemented exclusive or (XOR) circuit which may be utilized to rapidly and efficiently calculate parity for changes in updated data.

DRAM/XOR controller 148 is coupled to local bus 156. Also coupled to local bus 156 are multiple small computer system interface (SCSI) control chips 142, 144 and 146. Each SCSI control chip 142, 144 and 146 are defined as channels which may each support a disk drive storage system comprising a plurality of disks. Those having ordinary skill in this art will appreciate that alternative bus architectures may be utilized to implement the data storage system; however, the depicted embodiment of the present invention utilizes multiple disk drive data storage systems 42, 44 and 46 which are configured in the SCSI bus architecture.

Figure 4:
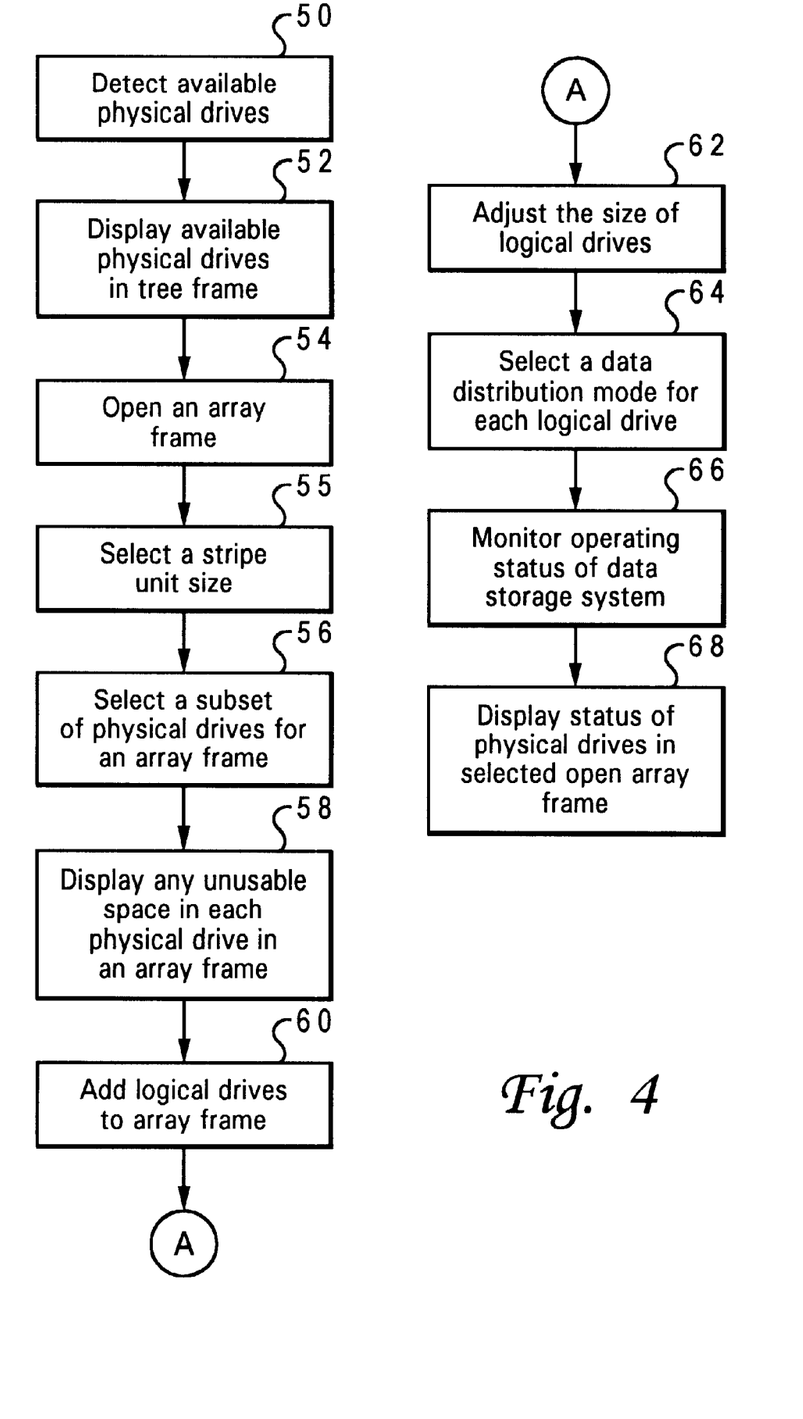
FIG. 4 illustrates a high-level flow diagram of the method for allowing a user to configure a data storage array in accordance with the method and system of the present invention.

With reference now to FIG. 4 there is illustrated a high-level logic flow diagram of the method for allowing a user to configure a data storage array in accordance with the method and system of the present invention. As depicted at block 50, multiple physical drives which are accessible to computer 10 through I/O adapter 20 are detected. Typically, groupings of physical drives connected to a single channel of an adapter are contained together in a disk drive system 42, 44 or 46, however each physical drive maintains a specific identification within the group.

As illustrated at block 52, multiple available physical drives detected at block 50 are graphically selectable in a tree frame of a graphical user interface where each of the available physical drives is represented by an icon. The available physical drives are first grouped by the I/O adapter utilized and further by the channel of the I/O adapter utilized. It will be understood by one skilled in the art that any other frame which shows the available physical drives may be utilized.

As depicted at block 54, an array frame is opened in the graphical user interface. In each array frame, an iconic representation of a data storage array may be graphically displayed in response to user selections for management purposes. Multiple array frames may be opened in the graphical user interface at any one point in time whereby the array frame actively selected may be edited by any of the user selections or may display the operational status of the data storage array. Data storage system 33 of FIG. 3 utilizes the user selections and editing to configure data storage system 33 and is utilized to provide operational status signals such that the operational status of data storage system 33 may be displayed.

As depicted at block 55, the user may select a stripe unit size. Typically the stripe unit size is in units of 8 kilobytes, 16 kilobytes, 32 kilobytes or 64 kilobytes.

As illustrated at block 56, a subset of the available physical drives displayed in the tree frame are selected by dragging each selected icon to an array frame. The subset of physical drives can be selected, for example, by using a mouse or another pointing device. A plurality of methods are available to select icons for placement in a new frame. In one method, the user may select and drag the icons. To select and drag each of the iconic representations of physical drives in the subset to the array frame, the user utilizes the mouse to guide a pointer coincident with the icon representing each physical drive, presses one of the buttons on the mouse to capture the icon, guides the icon to within the boundaries of the array frame and releases the button of the mouse to drop the icon into the array frame. Additionally, if a user desires to utilize all of the physical drives displayed under an I/O adapter or channel of the adapter, the group can be selected and dragged to the array frame. Typically, users will utilize each group of physical drives under a channel as a distinct data storage array to take advantage of performance enhancements due to the ease of array management.

As depicted at block 58, any unusable space within each physical drive of an array is graphically displayed in the array frame. For the space in each physical drive to be optimally utilized in an array, each physical drive must be the same size. However, in some cases, physical drives are selected for a data array which are not equivalent in size. In such cases, the smallest physical drive determines the amount of space in each physical drive which may be utilized. By showing unusable space, the user has a visual display of the disparity between sizes of physical drives and may reselect physical drives in order to reduce the disparity and optimize drive space usage.

As illustrated at block 60, multiple logical drives may be specified and displayed for an array in the array frame. Each logical drive may be depicted comprising a cross section of each physical drive in the array frame with a graphical boundary between logical drives. As illustrated at block 62, the size of each logical drive may be adjusted by moving the graphical boundaries between logical drives.

As illustrated at block 64, a data distribution mode for each logical drive is selected. The data distribution mode determines how the data physical drives will be graphically displayed in the array frame for each logical drive. Any RAID level may be included as a data distribution mode where data distribution associated with the RAID level determines the graphical display of the data physical drives. In selecting a data distribution mode, the user may request help whereby an automated help window opens with information needed by the user to correctly select a data distribution mode. When a data distribution mode is not yet selected, a default data distribution mode may determine how the data physical drives are graphically displayed in the array frame until a data distribution mode is selected.

As illustrated at block 66, the operating status of the data storage system is monitored by the personal computer 10 through status indications from each physical drive. The arrays, physical drives, logical drives and adapters may be monitored. Next, as depicted at block 68, in response to the monitoring, the operating status of each physical drive in the selected open array frame is graphically indicated by an indicative icon, text or shading. Additionally, the operating status of the logical drive is graphically indicated by an indicative icon, text or shading in response to the monitoring. The operating status of the logical drive may be graphically indicated in a critical state, running normally or defunct.

Figure 5:
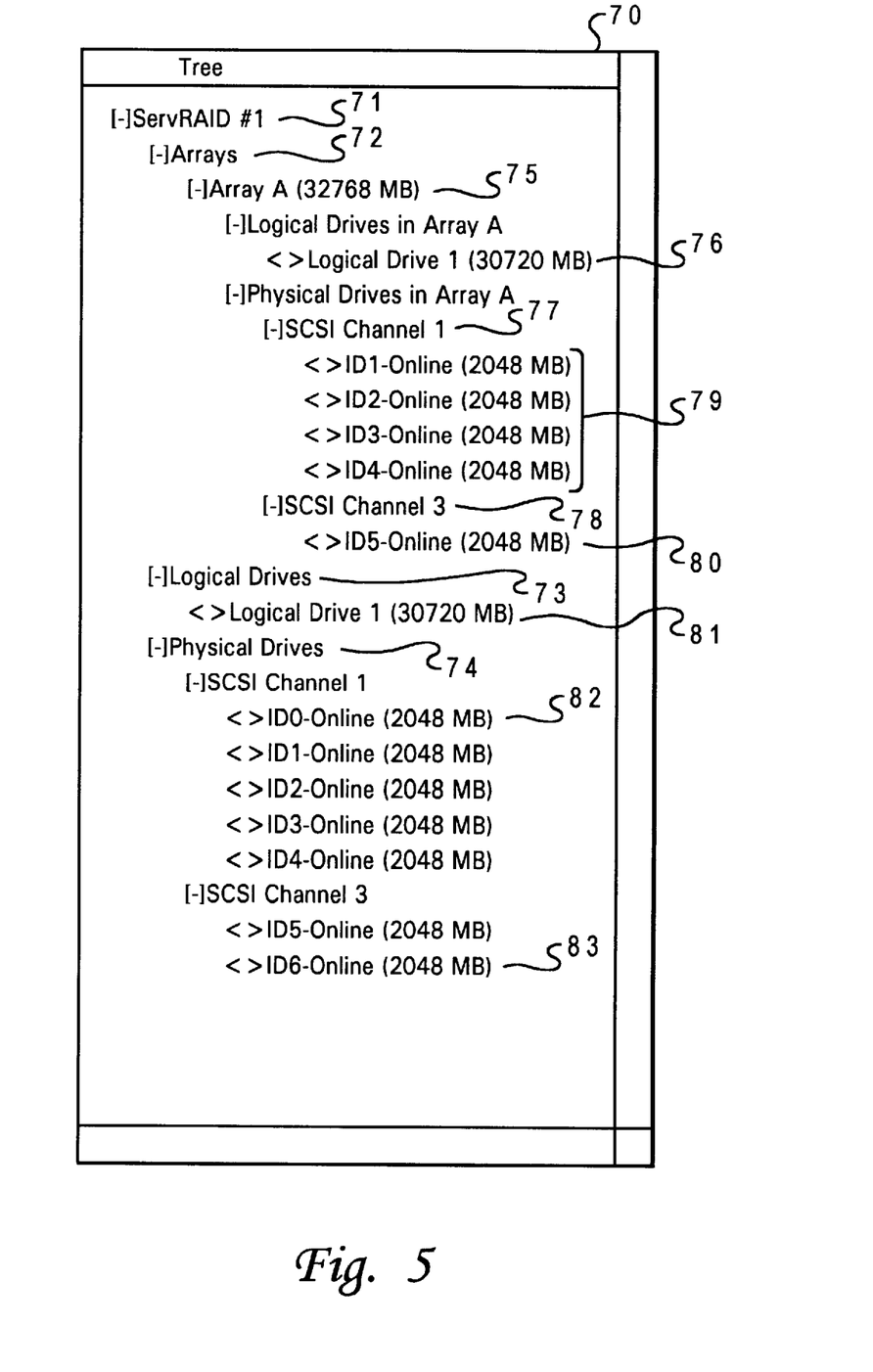
FIG. 5 depicts a pictorial illustration of a tree frame in a graphical user interface in accordance with the method and system of the present invention.

Referring now to FIG. 5, there is illustrated a tree frame 70 in a graphical user interface which may be utilized in accordance with the method and system of the present invention. In the example of FIG. 5, tree frame 70 displays the iconic representations of the components and configuration of ServeRAID #1 as illustrated at reference numeral 71. The components are hierarchically listed under three categories of Arrays, Logical Drives, and Physical Drives as depicted at reference numerals 72, 73 and 74 respectively. The user may configure an array by tree frame 70 through choosing the available physical drives and placing those drives into an array frame, as will be further described. Further, the user can see a component list of the physical and logical drives in an array in the tree frame 70.

Under the category of Arrays at reference numeral 72 are the arrays into which the physical drives and logical drives are divided. The only array shown in the present tree frame 70 is Array A, as illustrated at reference numeral 75. However, in other embodiments of the present invention additional arrays may be included.

Each array includes the further categories of logical drives, and physical drives. Each physical drive is further categorized by the SCSI channel through which the physical drive is connected. In tree frame 70, Logical Drive 1 is the only logical drive included in Array A as depicted at reference numeral 76. Under Physical Drives in Array A, SCSI Channel 1 is illustrated at reference numeral 77 and SCSI channel 3 is depicted at reference numeral 78. Included in Array A through SCSI channel 1 are physical drives ID1, ID2, ID3, and ID4 as illustrated at reference numeral 79. Through SCSI channel 3, Array A includes physical drive ID5 as depicted at reference numeral 80.

Following the hierarchical list of components within the array(s), all the logical drives are illustrated at reference numeral 73. Logical drive 1 is listed again under logical drives as depicted at reference numeral 81.

The physical drives are also listed under the physical drives category at reference numeral 74. However, there are additional physical drives listed under the physical drives category at reference numeral 74 which are not currently included in an array. Physical drive ID0 is depicted at reference numeral 82 under SCSI channel 1, however is not shown under the SCSI channel 1 of the Array A previously described. Additionally, physical drive ID6 is illustrated at reference numeral 83 under SCSI channel 3, however is not shown under the SCSI channel 3 of the Array A previously described.

Figure 6:
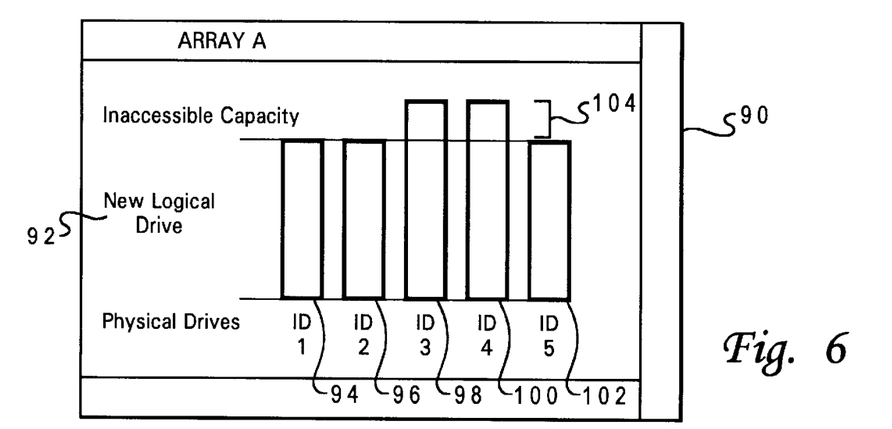
FIG. 6 illustrates a pictorial illustration of an array frame in a graphical user interface which provides an iconic representation of the data storage array in response to user selections in accordance with the method and system of the present invention.

Referring now to FIG. 6, there is depicted array A frame 90 in a graphical user interface which provides an iconic representation of the data storage array A in response to user selections which may be utilized in accordance with the method and system of the present invention. In the example of FIG. 6, array A frame 90 graphically displays and iconic representation of data storage array A including five physical drives ID1, ID2, ID3, ID4, and ID5 selected by the user and a new logical drive as depicted at reference numeral 92.

In array A frame 90, the graphical depictions of each of the physical drives are approximately proportional to the size of each physical drive. Physical drive ID1 is illustrated as a graphical region at reference numeral 94. Physical drive ID2 is depicted as a graphical region at reference numeral 96. Physical drive ID3 is illustrated as a graphical region at reference numeral 98. Physical drive ID4 is depicted as a graphical region at reference numeral 100. Finally physical drive ID5 is depicted as a graphical region at reference numeral 102.

Further referring to array A frame 90, physical drives ID3 and ID4 are greater in storage size than physical drives ID1, ID2 and ID5. However, in order to properly distribute the physical drives across the logical drives, the additional storage space in physical drives ID3 and ID4 becomes inaccessible capacity as depicted at reference numeral 104. In a case where there is great disparity between the size of the largest physical drive and smallest physical drive, the inaccessible capacity may not be to scale with the accessible capacity.

Figure 7:
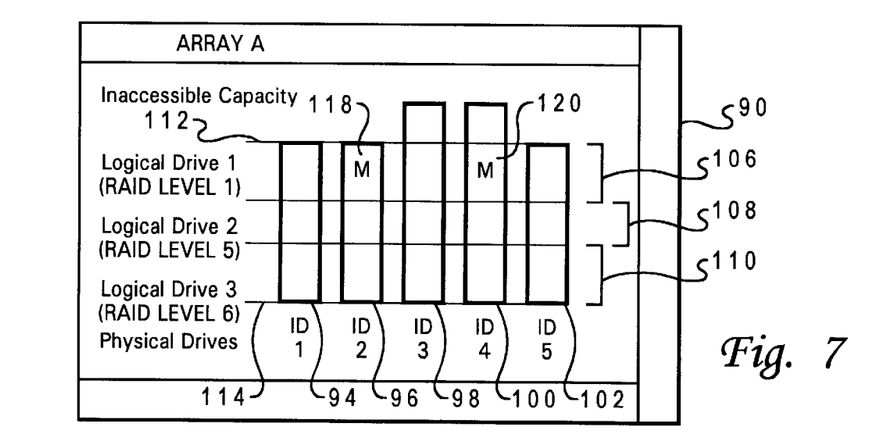
FIG. 7 depicts a pictorial illustration of an array frame in a graphical user interface which provides an iconic representation of the data storage array in response to user selections in accordance with the method and system of the present invention.

Referring now to FIG. 7, there is depicted array A frame 90 in a graphical user interface which provides an iconic representation of the data storage array A in response to user selections which may be utilized in accordance with the method and system of the present invention. In the example of FIG. 7, the user has further selected and named three logical drives. The graphical depictions of each of the logical drives are cross sections of each of the physical drives showing the interrelationship of the logical drives with the physical drives. Logical drive 1 is illustrated as multiple cross sections of graphical regions at reference numeral 106. Logical drive 2 is depicted as multiple cross sections of graphical regions at reference numeral 108. Logical drive 3 is illustrated as multiple cross sections of graphical regions at reference numeral 110.

To specify each of the logical drives, the user may move one of multiple graphical bars coincident with either of the boundary bars 112 or 114 to a new position. Upon moving a sliding bar from the boundary bar position to a new position, the user is prompted for a name to the newly distinguished logical disk. Once a logical drive is named, the user may still further move each sliding bar between logical drives in order to increase or decrease the size of a logical device. In other embodiments of the present invention, the size in a denomination of bytes may be identified for each logical device in order to aid the user in determining the size of each logical device. Generally, the size is shown in kilobytes.

In addition to determining the size of each logical device, the user may specify the type of data distribution mode that each logical drive operates under and view a graphical representation of the data distribution mode. For example, in the present embodiment, logical drive 1 is set to RAID level 1, logical drive 2 is set to RAID level 5 and and logical drive 3 is set to RAID level 0. With RAID level 1, data is distributed to pairs of physical drives which mirror each other. Physical drives ID2 and ID4 for logical drive 1 mirror physical drives ID1 and ID3 correspondingly as depicted by a textual "M" at reference numerals 118 and 120. With RAID level 5, one of the physical drives is set to hold parity data for each stripe placed in the physical drives. The parity data may rotate to different physical disks for each stripe. In this embodiment of the invention, individuals stripes are not distinguished, however in other embodiments of the present invention, frames may display stripes of each physical drive whereby the position of the parity data would be visible. With RAID level 0, data is distributed across all the drives with no error correction set-up therefore there are no textual distinctions of drives. Each of the textual representations may also be accomplished by shading or symbols with a user legend in order to graphically represent the data distribution mode to which each logical drive is set.

Figure 8:
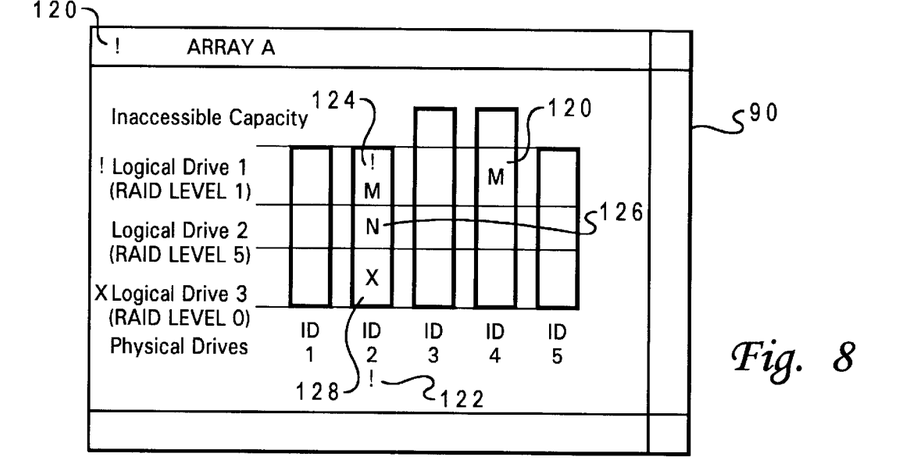
FIG. 8 illustrates a pictorial illustration of an array frame in a graphical user interface which depicts the operational status of the physical drives in the data storage array.

Personal computer 10 preferably monitors the operational status of each available physical drive of data storage 33 and reports the operational status of any physical drives graphically in an array frame. In FIG. 8, in array A frame 90 which is actively selected in the graphical user interface, the operation status of physical drives ID1, ID2, ID3, ID4 and ID5 is graphically illustrated. If a physical drive is operating normally, there is no additional graphical indicator of status. However, if a physical drive has failed, an additional graphical indicator may be included in the form of an icon, text and/or altered shading. In the example of FIG. 8, physical disk ID2 has failed. A graphical indicator in the form of textual "!" is depicted at reference numeral 120 next to the window identifier "ARRAY A" to indicate caution due to a failure in a component of the array. Further, a graphical indicator in the form of a textual "!" is depicted at reference numeral 122 under the failed physical disk ID2. Additionally, each of the logical device cross sections of failed physical disk ID2 include a graphical indicator of the type of failure in each logical drive.

Upon disk failure, depending on the data distribution mode assigned, the logical drive may be able to continue normal operation, reconstruct the lost data, or be defunct and unable to recover the data lost upon the disk failure. It is preferable that the operational status of each logical disk is shown in order that a user viewing the operational status of a data storage array can properly manage the data storage array. In the example in FIG. 8, a graphical indicator is illustrated at reference numeral 126 at logical device 2 in the form of a textual "N" representing that logical device 2 continues in normal operation. A graphical indicator is illustrated at reference numeral 124 in the form of a textual "!" representing that logical device 1 is in critical operation since there is a risk of logical drive failure if any other physical drive fails. A graphical indicator is illustrated at reference numeral 112 in the form of a textual "X" representing that logical device 3 is defunct whereby the data in the failed physical disk cannot be recovered for that logical device since there is no error correction through RAID level 0.

While FIG. 4–7 of the present invention have depicted windows in a graphical user interface with a particular manner of identifying parts of a data storage system, additional data such as the size of components, the amount of data stored on components and the brand of components may be among the additional information included in the windows. In addition, while arrays, physical disks and logical disks have been discussed as parts typically distinguished in a data storage system, other components including but not limited to hot-spare drives may be graphically displayed and managed without departing from the spirit and scope of the invention.

While the invention has been particularly shown and described with reference to a preferred embodiment, it will be understood by those skilled in the art that various changes in form and detail may be made therein without departing from the spirit and scope of the invention.

For example, although aspects of the present invention have been described with respect to a computer system executing software that directs the method of the present invention, it should be understood that the present invention may alternatively be implemented as a computer program product for use with a computer system. Programs defining the functions of the present invention can be delivered to a computer system via a variety of signal-bearing media, which include, without limitation, non-writable storage media (e.g. CD-ROM), writable storage media (e.g. a floppy diskette or hard disk drive), and communication media, such as computer and telephone networks including ethernet. It should be understood, therefore, that such signal-bearing media, when carrying or encoding computer readable instructions that direct the method functions of the present invention, represent alternative embodiments of the present invention.

What is claimed is:

1. A method for configuring and managing a plurality of data storage systems, said method comprising the steps of:

displaying a plurality of graphically designatable data storage systems within a computer system display, wherein said plurality of graphically designatable data storage systems include at least one physical drive and at least one logical drive;

selecting a subset of said plurality of graphically designatable data storage systems to be utilized in a data storage array, wherein said subset includes said at least one physical drive and said at least one logical drive, said at least one logical drive being displayed as a cross-sectional area of said iconic display of said at least one physical drive, said cross-sectional bounded by a graphical bar;

designating a data distribution mode for said at least one logical drive within said data storage array, wherein said data distribution mode indicates an inter-drive relationship between said at least one logical drive and said at least one physical drive;

automatically graphically displaying an iconic representation of said data storage array in accordance with said selected subset of data storage systems and said designated data distribution mode; and altering said iconic representation of said at least one logical drive to show an altered inter-drive relationship between said at least one physical drive and said at least one logical drive, wherein said step of altering said iconic representation of said at least one logical drive comprises moving said graphical bar to a new position with respect to said cross-sectional area to indicate a greater or lesser correspondence between said at least one logical drive and said at least one physical drive.

2. The method for configuring and managing a plurality of data storage systems according to claim 1, further comprising the step of:

varying said iconic representation of said data storage array to show an operational status of each of said data storage systems of said subset of data storage systems.

3. The method for configuring and managing a plurality of data storage systems according to claim 2, wherein said step of varying said iconic representation of said data storage array to show an operational status of each of said data storage systems of said subset of data storage systems comprises the steps of:

graphically designating said data storage systems which are operating normally by a normal graphic designation; and graphically designating said data storage systems which are failed by a failed graphic designation.

4. The method for configuring and managing a plurality of data storage systems according to claim 1, wherein said at least one logical drive comprises a plurality of logical drives, and wherein said designating step comprises the steps of:

setting each of said plurality of logical drives to a data distribution mode; and altering said iconic representation of said data storage array to show a graphical representation of said data distribution mode setting for each logical drive.

5. A system for configuring and managing a plurality of data storage systems, said system comprising:

a display within a computer system display of a plurality of graphically designatable data storage systems, wherein said plurality of graphically designatable data storage systems include at least one physical drive and at least one logical drive;

a selected subset of said plurality of graphically designatable data storage systems to be utilized in a data storage array, wherein said subset includes said at least one physical drive and said at least one logical drive, wherein said at least one logical drive is displayed as a cross-sectional area of said iconic display of said at least one physical drive, said cross-sectional area bounded by a graphical bar;

a designated data distribution mode for said at least one logical drive within said data storage array, wherein said data distribution mode indicates an inter-drive relationship between said at least one logical drive and said at least one physical drive;

means of automatically graphically displaying an iconic representation of said data storage array in accordance with said selected subset of data storage system and said designated data distribution mode; and means for altering said iconic representation of said at least one logical drive to show an altered inter-drive relationship between said at least one physical drive and said at least one logical drive, wherein said means for altering said iconic representation of said at least one logical drive further comprises means for moving said graphical bar to a new position with respect to said cross-sectional area to indicate a greater or lesser correspondence between said at least one logical drive and said at least one physical drive.

6. The system for configuring and managing a plurality of data storage systems according to claim 5, further comprising means for varying said iconic representation of said data storage array to show an operational status of each of said data storage systems of said subset of data storage systems.

7. The system for configuring and managing a plurality of data storage systems according to claim 6, wherein varying said iconic representation of said data storage array to show an operational status of each of said data storage systems of said subset of data storage systems further comprises:

means for graphically designating said data storage systems which are operating normally by a normal graphic designation; and means for graphically designating said data storage systems which are failed by a failed graphic designation.

8. The system for configuring and managing a plurality of data storage systems according to claim 5, wherein said at least one logical drive comprises a plurality of logical drives, said system further comprising:

means for setting each of said plurality of logical drives to a data distribution mode; and means for altering said iconic representation of said data storage array to show a graphical representation of said data distribution mode setting for each logical drive.

9. The system for configuring and managing a plurality of data storage systems according to claim 8, wherein said data distribution mode is a RAID level.

10. The system for configuring and managing a plurality of data storage systems according to claim 9, wherein said at least one physical drive comprises a plurality of physical drives, and wherein for said RAID level, one of said plurality of physical drives is set to hold parity data for each stripe placed on said plurality of physical drives, said parity data rotatable to different ones of said plurality of physical drives, said system further comprising means for graphically displaying stripes of each physical drive such that the position of said parity data is visible within said iconic representation of said data storage array.

11. A computer program product residing on a computer usable medium for configuring and managing a plurality of data storage systems, said computer program product comprising:

program code means for displaying a plurality of graphically designatable data storage systems within a computer system display, wherein said plurality of graphically designatable data storage systems include at least one physical drive and at least one logical drive;

program code means for selecting a subset of said plurality of graphically designatable data storage systems to be utilized in a data storage array, wherein said subset includes said at least one physical drive and said at least one logical drive, said at least one logical drive being displayed as a cross-sectional area of said iconic display of said at least one physical drive, said cross-sectional bounded by a graphical bar;

program code means for designating a data distribution mode for said at least one logical drive within said data storage array, wherein said data distribution mode indicates an inter-drive relationship between said at least one logical drive and said at least one physical drive; and     program code means for automatically graphically displaying an iconic representation of said data storage array in accordance with said selected subset of data storage systems and said designated data distribution mode; and     altering said iconic representation of said at least one logical drive to show an altered inter-drive relationship between said at least one physical drive and said at least one logical drive, wherein said step of altering said iconic representation of said at least one logical drive comprises moving said graphical bar to a new position with respect to said cross-sectional area to indicate a greater or lesser correspondence between said at least one logical drive and said at least one physical drive.

12. The method for configuring and managing a plurality of data storage systems according to claim 1, wherein said step of selecting a subset of said plurality of graphically designatable data storage systems comprises the step of pointing to and dragging an iconic representation of at least one of said graphically designatable data storage systems into a graphically displayed array frame.

13. The method for configuring and managing a plurality of data storage systems according to claim 1, wherein said inter-drive relationship indicated by said data distribution mode is indicative of a RAID level.

14. The method for configuring and managing a plurality of data storage systems according to claim 13, wherein said at least one physical drive comprises a plurality of physical drives, and wherein for said RAID level, one of said plurality of physical drives is set to hold parity data for each stripe placed on said plurality of physical drives, said parity data rotatable to different ones of said plurality of physical drives, said method further comprising graphically displaying stripes of each physical drive such that the position of said parity data is visible within said iconic representation of said data storage array.

* * * * *